(12) United States Patent
Khoshnevis

(10) Patent No.: US 10,464,134 B2
(45) Date of Patent: **\*Nov. 5, 2019**

(54) INSERTING INHIBITOR TO CREATE PART BOUNDARY ISOLATION DURING 3D PRINTING

(71) Applicant: University of Southern California, Los Angeles, CA (US)

(72) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/201,848

(22) Filed: Jul. 5, 2016

(65) Prior Publication Data

US 2017/0151610 A1   Jun. 1, 2017

Related U.S. Application Data

(63) Continuation of application No. 14/206,762, filed on Mar. 12, 2014, now Pat. No. 9,403,725.

(Continued)

(51) Int. Cl.
  *B22F 3/105*  (2006.01)
  *C04B 33/04*  (2006.01)
  (Continued)

(52) U.S. Cl.
  CPC ............ *B22F 3/1055* (2013.01); *B28B 1/001* (2013.01); *B29C 64/153* (2017.08); *B29C 64/165* (2017.08); *B33Y 30/00* (2014.12); *C04B 33/04* (2013.01); *C04B 33/24* (2013.01); *C04B 35/48* (2013.01); *C04B 35/622* (2013.01); *C04B 35/62218* (2013.01); *C04B 35/6303* (2013.01); *C04B 35/634* (2013.01);
  (Continued)

(58) Field of Classification Search
  CPC ... B29C 64/165; B29C 64/153; B29C 64/209; B29C 64/336; B22F 3/1055; B22F 2003/1032; B22F 2003/1054; B28B 1/001; C04B 2235/6026; C04B 35/63452; C04B 33/24; C04B 33/04
  See application file for complete search history.

(56) References Cited

U.S. PATENT DOCUMENTS 4,239,715 A * 12/1980 Pratt .................. B05D 1/42
                                                    264/112
4,323,756 A *  4/1982 Brown ................ B22F 3/006
                                                    219/121.66

(Continued)

*Primary Examiner* — Edmund H Lee
*Assistant Examiner* — Emmanuel S Luk
(74) *Attorney, Agent, or Firm* — Snell & Wilmer L.L.P.

(57) ABSTRACT

A 3D printing system may print a desired 3D object. A fusible powder may fuse when subjected to a fusing condition. A deposition system may deposit portions of the fusible powder on a substrate. A fusing system may apply the fusing condition to the deposited fusible powder. Inhibitor material may not fuse when subjected to the fusing condition. An insertion system may insert a portion of the inhibitor material between portions of the deposited fusible powder after having been deposited by the deposition system, but before being fused by the fusing system, so as to form a boundary that defines at least a portion of a surface of the desired 3D object.

20 Claims, 6 Drawing Sheets

Related U.S. Application Data

(60) Provisional application No. 61/777,939, filed on Mar. 12, 2013.

(51) Int. Cl.

| | | |
|---|---|---|
| *C04B 35/48* | (2006.01) | |
| *C04B 35/63* | (2006.01) | |
| *C04B 35/622* | (2006.01) | |
| *C04B 33/24* | (2006.01) | |
| *C04B 35/634* | (2006.01) | |
| *B28B 1/00* | (2006.01) | |
| *B33Y 30/00* | (2015.01) | |
| *B29C 64/153* | (2017.01) | |
| *B29C 64/165* | (2017.01) | |
| *B29L 23/00* | (2006.01) | |
| *B22F 3/10* | (2006.01) | |

(52) U.S. Cl.
CPC ..... *C04B 35/63452* (2013.01); *B22F 2003/1032* (2013.01); *B22F 2003/1054* (2013.01); *B22F 2003/1056* (2013.01); *B29L 2023/00* (2013.01); *C04B 2235/6026* (2013.01); *Y02P 10/295* (2015.11)

(56) References Cited

U.S. PATENT DOCUMENTS

| | | |
|---|---|---|
| 5,387,380 A | 2/1995 | Cima et al. |
| 6,589,471 B1 | 7/2003 | Khoshnevis |
| 6,764,636 B1 * | 7/2004 | Allanic ............... B29C 41/12 |
| | | 264/401 |
| 7,241,415 B2 | 7/2007 | Khoshnevis |
| 7,291,242 B2 | 11/2007 | Khoshnevis |
| 7,748,971 B2 * | 7/2010 | Hochsmann ........... B05D 1/26 |
| | | 425/90 |
| 7,878,789 B2 | 2/2011 | Khoshnevis |
| 9,403,725 B2 | 8/2016 | Khoshnevis |
| 9,505,172 B2 * | 11/2016 | Ljungblad ........... B22F 3/1055 |
| 2003/0062655 A1 | 4/2003 | Lohner et al. |
| 2004/0084814 A1 | 5/2004 | Boyd et al. |
| 2004/0135276 A1 | 7/2004 | Nielsen et al. |
| 2005/0087903 A1 | 4/2005 | Farr et al. |
| 2005/0093208 A1 | 5/2005 | Boyd et al. |
| 2006/0290032 A1 | 12/2006 | Sano |
| 2007/0057408 A1 | 3/2007 | Sandqvist et al. |
| 2010/0044903 A1 | 2/2010 | Rhoades et al. |
| 2011/0059247 A1 | 3/2011 | Kuzusako et al. |
| 2013/0034633 A1 | 2/2013 | von Hasseln |
| 2015/0110910 A1 | 4/2015 | Hartmann et al. |
| 2017/0334023 A1 * | 11/2017 | Mohr ................... B22F 3/1055 |
| 2018/0079133 A1 * | 3/2018 | Ederer ................. B29C 31/02 |

\* cited by examiner

INSERTING INHIBITOR TO CREATE PART BOUNDARY ISOLATION DURING 3D PRINTING

CROSS-REFERENCE TO RELATED APPLICATION

This application is a continuation of U.S. application Ser. No. 14/206,762, entitled "INSERTING INHIBITOR TO CREATE PART BOUNDARY ISOLATION FOR 3D PRINTING," filed Mar. 12, 2014; which is based upon and claims priority to U.S. provisional patent application 61/777,939, entitled "3D PRINTING BY PART BOUNDARY ISOLATION THROUGH POWDER PARTICLE INSERTION," filed Mar. 12, 2013. The entire content of both applications is incorporated herein by reference.

BACKGROUND

Technical Field

This disclosure relates to printers that produce desired three-dimensional (3D) objects by fusing deposited powder, including 3D printers that use selective inhibition sintering (SIS).

Description of Related Art

Selective inhibition sintering (SIS) may be used to fabricate meso-scale polymeric and metallic parts. The fabrication may be in layers using loose powder as the initial material. Polymeric or metallic powder may be printed in thin layers. After each layer is printed, a liquid may be inkjet-printed on the layer in a pattern that defines the periphery of that layer, the interior portion of which may be a layer in a desired 3D object. The pattern for each layer may be derived from slices of a 3D CAD model of the object that is to be printed.

The liquid may include an agent that prevents powder particles of base polymer or metal that have been treated with the liquid from fusing with each other when heated. The infusible material may define an exterior surface of the desired 3D object. The fused material on both sides of the unfused material may then be easily separate from one another, thus allowing the desired 3D object to be readily isolated.

The fusible particles may be fused with heat (i.e., sintering). The sintering may take place after each layer is deposited, such as by passing a heat radiating device over each layer. All of the layers may instead be deposited, each with any needed inhibiting liquid, and the entire loose powder vat may then be sintered at the same time in a sintering furnace.

The inhibitor may be a salt solution which leaves particles of salt crystal in the inhibited regions after water evaporation. In case of polymeric part fabrication, these salt crystals may serve to separate the neighboring base polymer powder material particles and prevent them from fusing upon sintering. More details about this and related processes may be found in U.S. Pat. Nos. 6,589,471, 7,241,415, and 7,291,242.

Although SIS technology can be used to fabricate polymeric and metallic parts, in cases of very high temperature sintering it can be difficult to separate adjacent, uninhibited powder regions after they are sintered. Also, the vacuum that may exist when using 3D printing in space (e.g., on the moon and asteroids) may cause the fluid inhibitor to evaporate, preventing the fluid from inhibiting sintering of areas that are saturated with the fluid.

SUMMARY

A 3D printing system may print a desired 3D object. A fusible powder may fuse when subjected to a fusing condition. A deposition system may deposit portions of the fusible powder on a substrate. A fusing system may apply the fusing condition to the deposited fusible powder. Inhibitor material may not fuse when subjected to the fusing condition. An insertion system may insert a portion of the inhibitor material between portions of the deposited fusible powder after having been deposited by the deposition system, but before being fused by the fusing system, so as to form a boundary that defines at least a portion of a surface of the desired 3D object.

The insertion system may include a nozzle that has an interior passageway through which the inhibitor material travels. The nozzle may have a lower end that includes a leading edge in the shape of a plow that can plow a trough between portions of the fusible powder when the lower end of the nozzle traverses such portions. The lower end may include a rearward-facing opening though which inhibitor material is ejected from the nozzle and into the trough immediately after the trough is plowed by the leading edge, thereby filling the trough as the trough is plowed. The insertion system may cause the leading edge to plow through portions of the fusible powder and the opening to eject inhibitor material from the nozzle immediately after the trough is plowed by the leading edge, thereby filling the trough as the trough is plowed.

The inhibitor material may be a powder. The insertion system may include a vibrating element that controls the flow of the inhibitor powder.

The inhibitor material may be a liquid.

The insertion system may only use the force of gravity to cause the inhibitor material to travel through the passageway and be ejected into the trough.

The insertion system may include a rotary axis actuator that controllably rotates the leading edge of the nozzle so as cause the leading edge to always be leading the direction of the nozzle movement.

The deposition system may deposit the fusible powder in stacked layers. The insertion system may insert the inhibitor material between the portions of the fusible powder in each stacked layer after the deposition system deposits the stacked layer into which the inhibitor material is inserted and before the deposition system deposits the next stacked layer.

The insertion system may insert the inhibitor material while the lower end of the nozzle is moving horizontally and while the lower end of the nozzle is moving vertically.

The insertion system may insert the inhibitor material between portions of multiple layers of fusible powder, beginning to do so after all of the multiple layers have been deposited by the 3D printer.

Guy wires may be attached to the nozzle that prevent the nozzle from bending while the nozzle is moved inside the base powder and inhibitor material is being inserted.

The insertion system may include a six-axis gantry control system that separately controls six axes of nozzle movement.

The rearward-facing opening may have an adjustable height. The height of the rearward-facing opening may be controlled by a movable gate.

The fusing condition may be sintering. The fusible powder may include metallic powder. The inhibitor material may be a powdered ceramic. The inhibitor material may include magnesium oxide.

The fusible condition may be exposure to a liquid.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
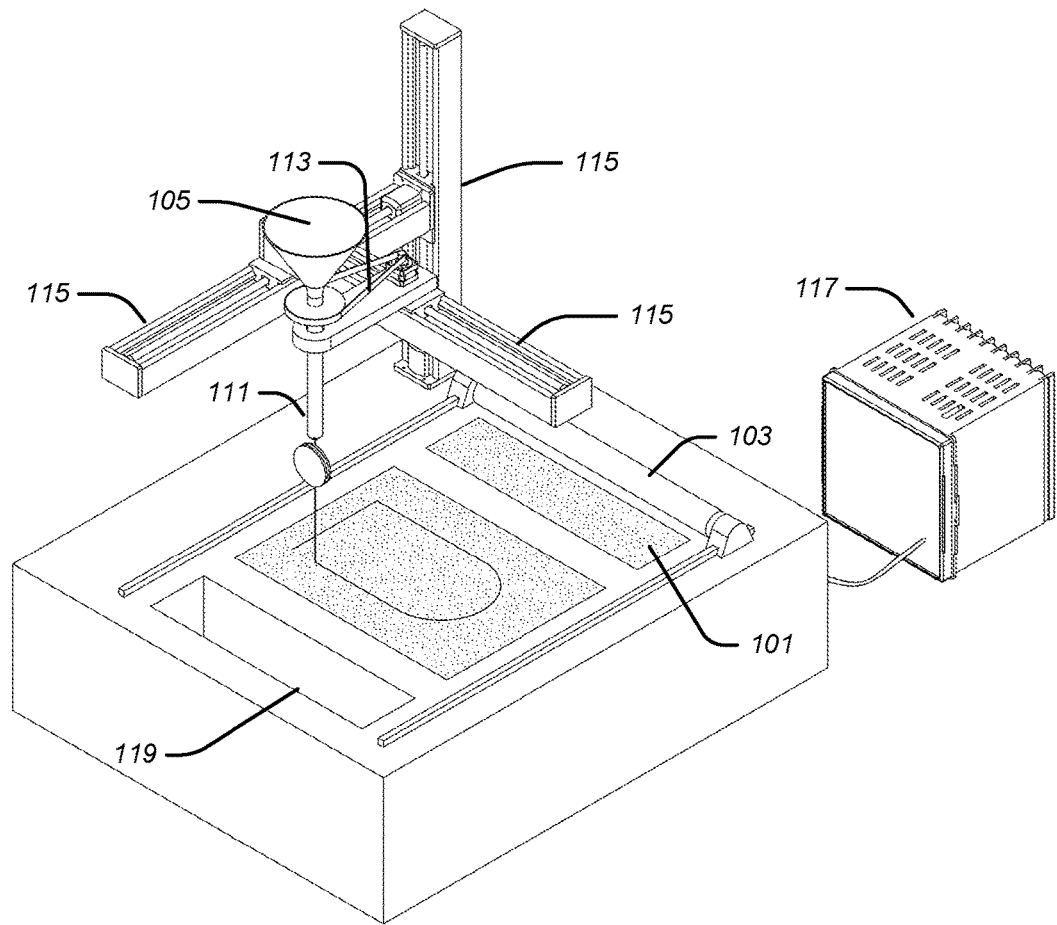
FIG. 1 illustrates an example of a 3D printing system that creates part boundary isolation during 3D printing by inserting inhibitor material.

FIG. 1 illustrates an example of a 3D printing system that creates part boundary isolation during 3D printing by inserting inhibitor material. The 3D printing system may include fusible powder 101 that fuses when subjected to a fusing condition; a deposition system that may include a powder spreading roller 103 that deposits portions of the fusible powder in form of a thin layer; a fusing system (not shown) that applies the fusing condition to the deposited fusible powder; inhibitor material 105 that may be in a hopper and that does not fuse when subjected to the fusing condition; and an insertion system that inserts a portion of the inhibitor material between portions of the fusible powder after having been deposited by the deposition system, but before the fusing powder being fused by the fusing system, so as to form a boundary that defines at least a portion of a surface of the desired 3D object. The infusion system may include a nozzle 111, a rotating axis controller 113, a gantry system 115, and a controller 117.

The deposition system may deposit the fusible powder 101 in layers or all at once. Examples of a deposition system may be found in U.S. Pat. Nos. 6,589,471, 7,241,415, and 7,291,242.

The fusible powder 101 may include metallic powder material, such as bronze, stainless steel, and/or titanium, or ceramic powder material, such as zirconia, porcelain, and/or a mixture of different ceramics, such as in Lunar soil (regolith) the particles of which may fuse when heated. The fusible powder 101 may be particulate material mixed with an uncured binder.

The inhibitor material 105 may be a fine dry powder, such as a powdered ceramic. The inhibitor material may include magnesium oxide that may have a sintering temperature of over 1500 degrees C., and/or ilmenite commonly found on Moon and Mars.

This fusible powder may be material that can be fused, not by heat, but by water or a fluidic adhesive. For example, powder materials such as plaster or cement which can be consolidated by water may be used as the fusible powder. Correspondingly, ceramic, metallic, and/or any other material that does not react with water may be used as the inhibitor material. After delivery of inhibitor material for each layer, the layer surface, including a small amount beyond the boundary, may be sprayed with water to make up for any inaccuracies in the spray. After completion of all layers, a cured part may be extracted, while excess cured portions on the outside may fall, as the inhibitor material which separates the part from excess cured portions may remain in its unfused form.

Alternatively, fusible powder may be coated with compound A of a thermoset (e.g., epoxy) and the layers may be sprayed by component B of the thermoset. The two adhesive compounds may then react and consolidate the coated fusible powder, while the inhibitor material would only be exposed to compound B and thus may remain unfused.

Inhibitors in liquid or paste forms may be used instead of powder. However, the flow control of inhibitor delivery may be difficult. Unlike the case of powder, the fluid delivery may have to be pressurized and accurately regulated.

The rotary axis actuator 113 may controllably rotate a leading edge of the nozzle 111, so as to cause the leading edge to always be leading the direction of the nozzle movement.

The gantry system 115 may controllably cause the nozzle 111 to move to different locations while the inhibitor material 105 is inserted between deposited fusible powder. The gantry system 115 may move the nozzle 111 only horizontally or may also move the nozzle 111 vertically. The gantry system 115 may move the nozzle 111 in three dimensional space. This may enable the inhibitor material 105 to be deposited in any desired straight or curved path. The gantry system 115 may provide six axis of nozzle movement that may be controlled to create inclined layer edges. A tall opening in the nozzle orifice may be used to increase the height of the inhibitor material that is inserted.

The controller 117 may be a general or special purpose computer programmed to cause the deposition system to deposit the fusible powder at desired locations and in desired amounts, the gantry system 115 to position the nozzle 111 at desired locations, the nozzle 111 to insert the inhibitor material 105 at locations within the deposited fusible powder that collectively create a portion of a surface of a desired 3D object based on a model of the object (such as a CAD model), and the fusion system to fuse the entire mixture, either layer by layer or all at once. The controller 117 may cause the inhibitor material 105 to be inserted in a pattern that demarcates one or more surfaces of the object to be printed.

Figure 2A:
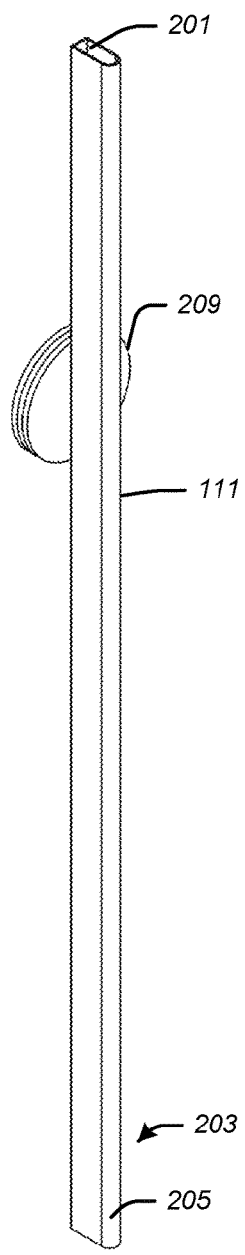
FIGS. 2A and 2B illustrate front and rear views of the nozzle that is illustrated in FIG. 1 and that may be used to insert the inhibitor material between portions of fusible powder.
Figure 2B:
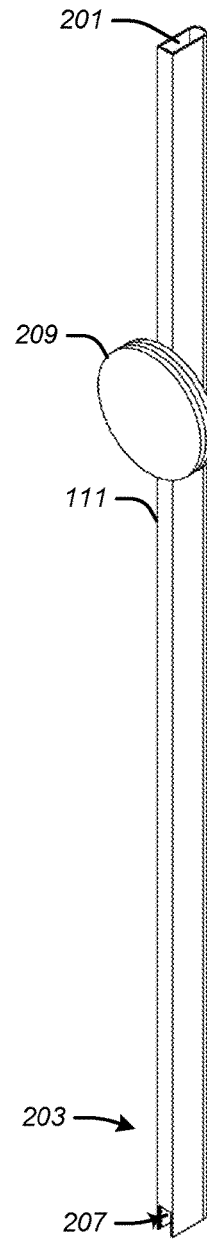

FIGS. 2A and 2B illustrate front and rear views of the nozzle 111 that is illustrated in FIG. 1 and that may be used to insert the inhibitor material 105 between portions of fusible powder 101. The nozzle 111 may have an interior passageway 201 through which the inhibitor material 105 may travel. The nozzle 111 may have a lower end 203 that includes a leading edge 205 in the shape of a plow that can plow a trough between portions of the fusible powder when the lower end of the nozzle traverses such portions. The plow may have any profile, such as a profile that minimizes disturbances to the fusible powder, beyond the width of the plow. That profile may be semi-circular, as illustrated in FIGS. 2A and 2B, V-shaped with the vertex of the V facing forward, or otherwise.

The lower end 203 may include a rearward-facing opening 207 though which inhibitor material can be ejected from the nozzle and into the trough immediately after the trough is plowed by the leading edge, thereby filling the trough as the trough is plowed. The insertion system 109 may cause the leading edge 205 to plow through portions of the fusible powder. The insertion system 109 may also cause the opening 207 to eject inhibitor material from the nozzle 111 immediately after the trough is plowed by the leading edge 205, thereby filling the trough as the trough is plowed.

The insertion system 109 may include a vibrating element 209 that controls the flow of the inhibitor material 105 when it is powder. The vibrating element 209 may include two or more parallel elements that are caused to controllably vibrate at a high frequency, such as by piezoelectric disks or by other means. An example of such a vibrating element is illustrated in U.S. Pat. No. 7,878,789.

The insertion system 109 may only use the force of gravity to cause the inhibitor material 105 to travel through the passageway 201 when it is vibrated and to fall into the trough. The inhibitor material may not fall down without the force of vibration.

While the nozzle 111 is stationary and its lower end 203 is resting on fusible powder, its opening 207 may be blocked by the fusible powder. Thus, the inhibitor material 105 may be blocked from exiting the nozzle 111, even when the vibrating element 209 is vibrating. Injection of the inhibitor material 105 may only happen when the vibrating element 209 is vibrating and the nozzle 111 is moving, as the movement of the nozzle 111 may create a void in front of the opening 207. The volume of the void may opportunistically be filled by the inhibitor material 105. The rate of inhibitor injection may be a function of nozzle speed. The lower the speed, the lower the rate of void creation and hence the lower the rate of inhibitor material injection. This can provide a self-flow regulation phenomenon that may result in precision deposition of inhibitor without an elaborate flow controller mechanism.

The fusing system 105 may inject a liquid that cures the uncured binder. The fusing system 105 may instead be a heater that sinters the fusible powder. The heating may be generated by resistive heating, microwave, or other heating means that sinters the fusible powder 101, but leaves the inhibitor material 105 intact because of its higher temperature sintering heat requirement.

After sintering, the final part may be separated from the rest of the sintered material. In case of complex part geometries, separation lines may be created by the nozzle 111 outside the part geometry, connecting selected points on the layer boundary to the edge of the powder volume to ease part separation.

Figure 3:
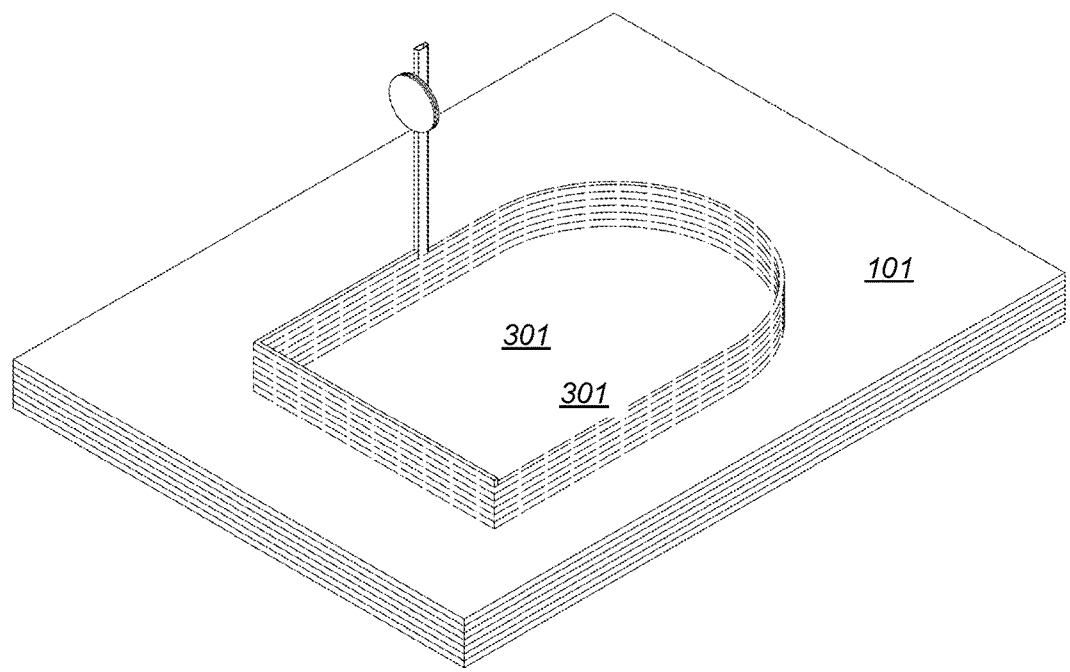
FIG. 3 illustrates an example of a desired 3D object being printed with the 3D printer system illustrated in FIG. 1.

FIG. 3 illustrates an example of a desired 3D object 301 being printed with the 3D printer system illustrated in FIG. 1. The deposition system may deposit the fusible powder 101 in stacked layers or all at once. The insertion system 109 may insert the inhibitor material 105 between the portions of the fusible powder in each stacked layer after the deposition system deposits the stacked layer into which the inhibitor material 105 is inserted and before the deposition system 10 deposits the next stacked layer. The fusible powder 101 may be fused after each layer is deposited and the inhibitor material 105 is inserted in the layer, or only after all of the layers and insertions are completed.

Figure 4:
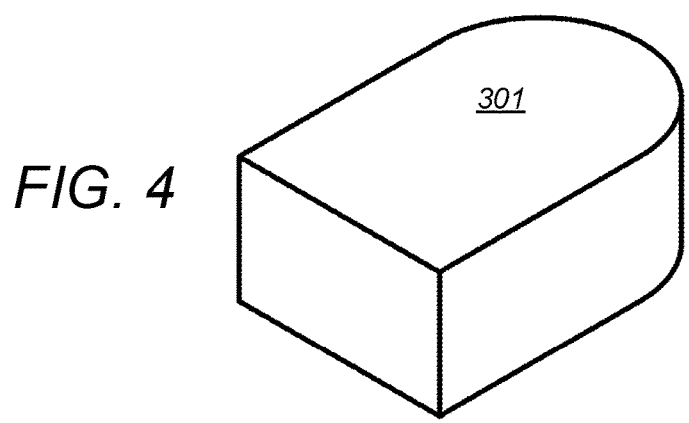
FIG. 4 illustrates the 3D object that has been printed in FIG. 3, after it is removed from fused material that surrounds it.

FIG. 4 illustrates the 3D object 301 that is being printed in FIG. 3, after it is separated from other fused material that surrounds it.

Figure 5A:
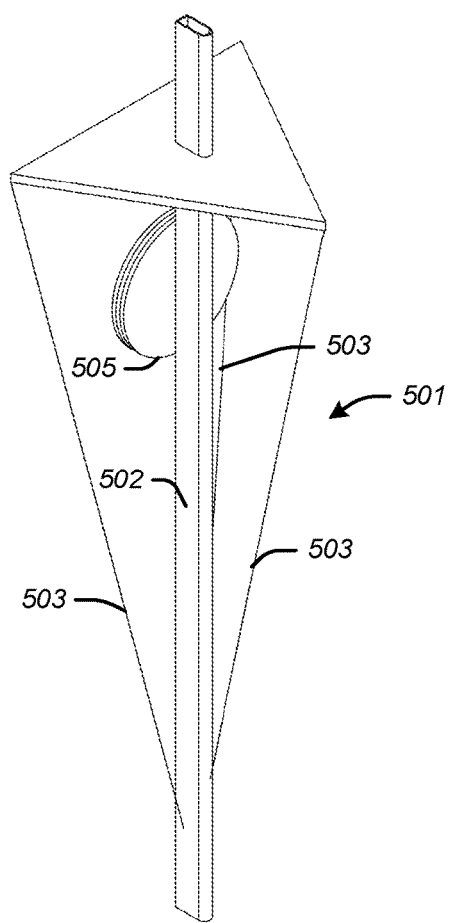
FIGS. 5A and 5B illustrate front and rear views of another example of a nozzle that may be used to insert inhibitor material between portions of unfused fusible powder.
Figure 5B:
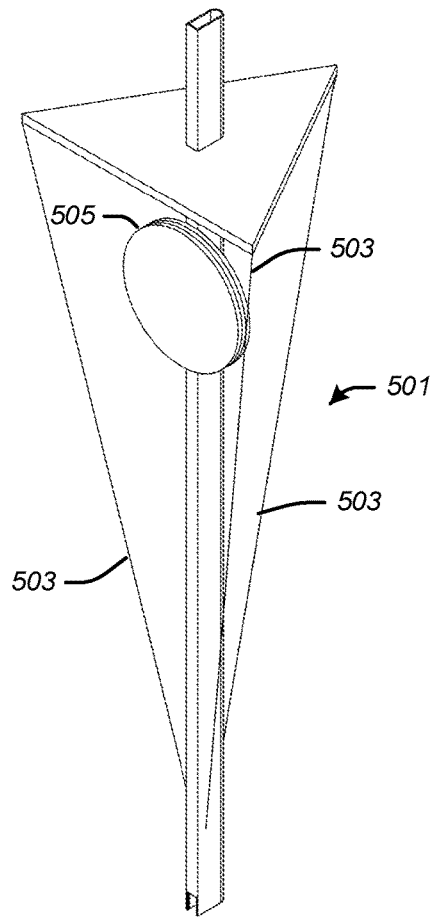

FIGS. 5A and 5B illustrate front and rear views of another example of a nozzle 501 that may be used to insert inhibitor material 105 between portions of fusible powder. The nozzle may have a long flute 502. Thin guy wires 503 may be attached to the nozzle 501 to prevent the nozzle 501 from bending while the nozzle is moved inside the fusible powder and the inhibitor material 105 is being inserted. All other aspects of the nozzle 501 may be the same as the nozzle 111. A vibrating element 505 may be used and may be the same as the vibrating element 209.

It may be possible to deposit the inhibitor material 105 for an entire set of part layer borders, without progressive layer spreading of the fusible powder 101. This may be done by inserting the nozzle 501 into a volume of fusible powder 101. The lower end of the nozzle 501 can then be moved to the bottom layer of the part to be created and moved horizontally to demarcate the boundary of this layer. The lower end of the nozzle 501 may then be elevated to the height of the next layer to create an inhibited boundary at the next layer. The cycle may continue until the inhibitor powder is deposited for all layer borders. After inhibitor deposition is complete, the nozzle may be removed and the powder vat transferred to a sintering furnace.

Movement of the nozzle and its guy wires inside the loose powder volume may only disturb the base powder segment that is on top of the layer being created and may be above all lower layers as well. Therefore, treated segments of the part under fabrication may remain undisturbed by nozzle movement.

Figure 6:
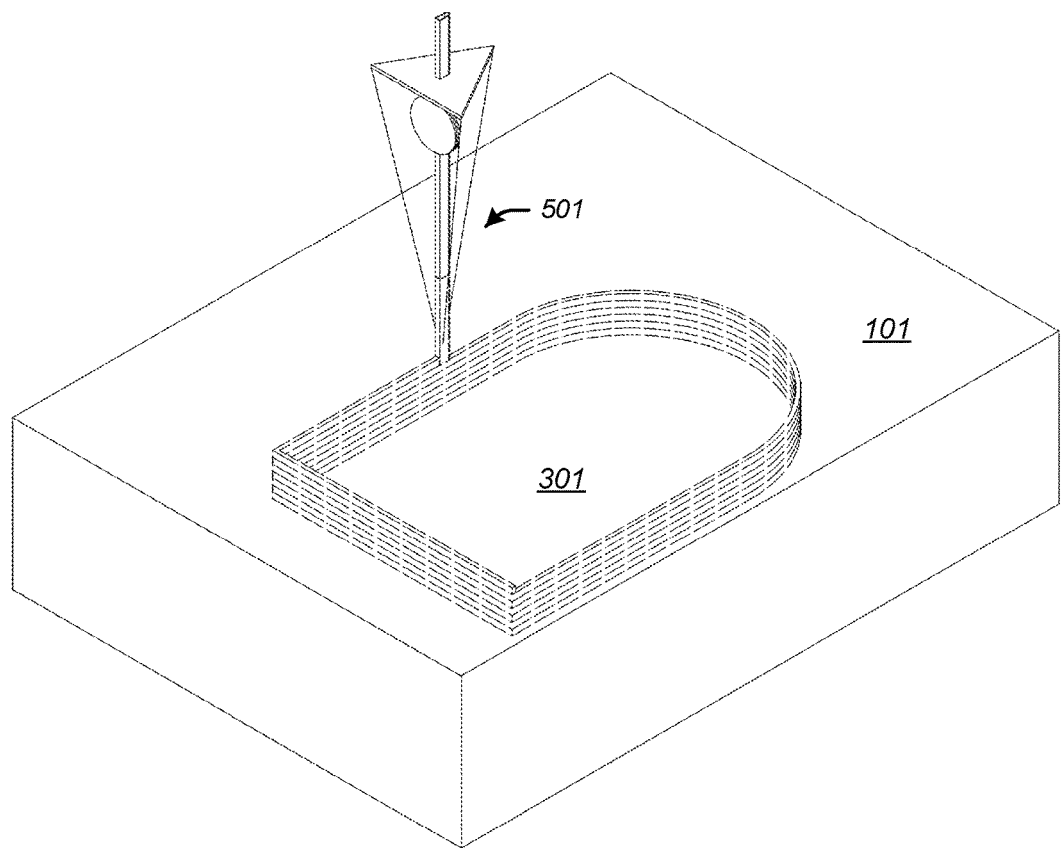
FIG. 6 illustrates an example of a desired 3D object being printed with the nozzle illustrated in FIGS. 5A and 5B.

FIG. 6 illustrates an example of a desired 3D object being printed with the nozzle 501 illustrated in FIGS. 5A and 5B. All of the fusible powder 101 may be deposited, either in layers or otherwise, before any of the inhibitor material 105 is inserted. To facilitate this, the nozzle 501 and the remaining portions of the insertion system 109 may cause the nozzle 501 to insert inhibitor material 105 into the fusible powder 101 while moving horizontally, vertically, in any combination of these directions, and at any angle.

Figure 7A:
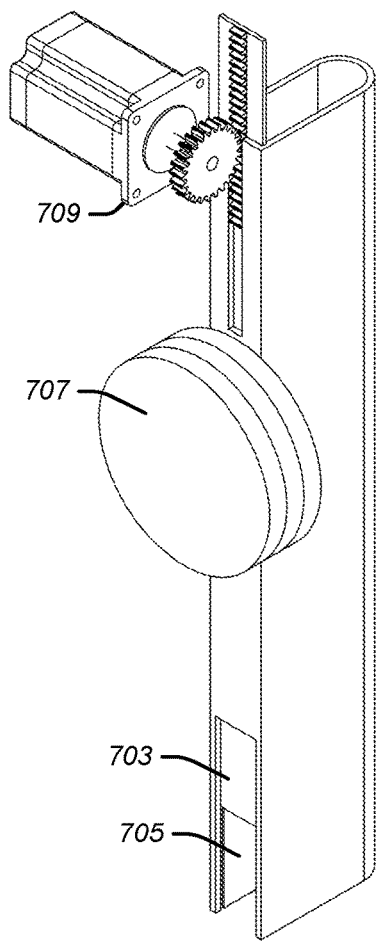
FIGS. 7A and 7B illustrate front and rear views of another example of a nozzle that includes a movable gate that controls the height of a rearward-facing opening in the nozzle.
Figure 7B:
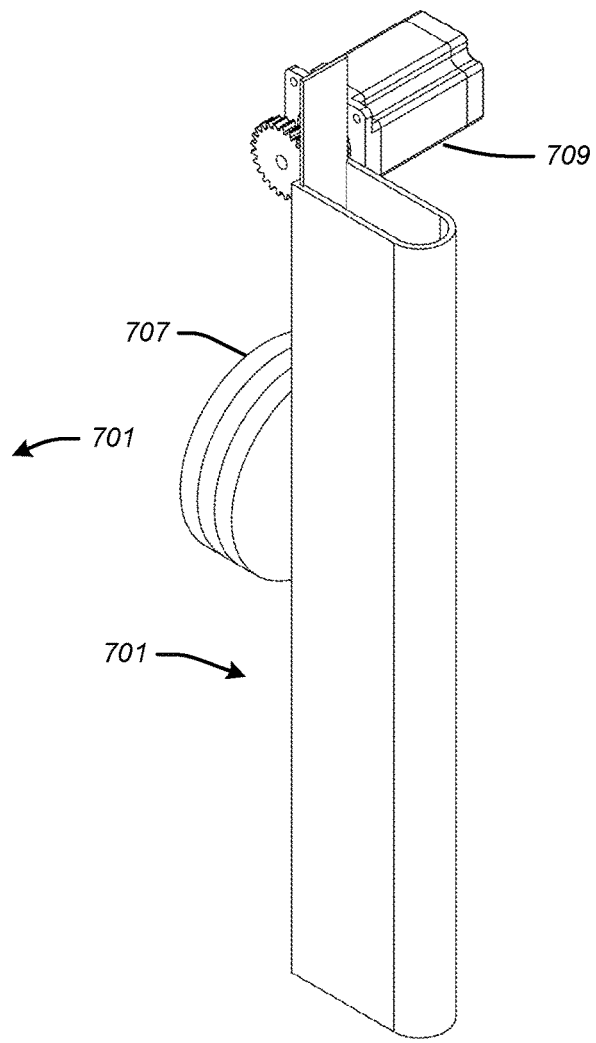

FIGS. 7A and 7B illustrate front and rear views of another example of a nozzle 701 that may include a movable gate 703 that may control the height of a rearward-facing opening 705 in the nozzle 701. All other aspects of the nozzle 701 may be the same as the nozzle 111. To control the height of the opening 705, a gate positioning mechanism 707, such as a motor and associate gear, may be used.

Varying the size of the opening 705 may vary the height of the inserted inhibitor material 105. This may be useful during high-speed processing. Thick layers of base material may sometimes be spread and inhibitor borders with higher heights may be delivered. For slant surfaces, a six-axis gantry may be used to provide pitch and yaw orientations for the nozzle 701, in addition to rotation and XYZ motions.

The 3D printing systems that have been described may be used to print polymeric, metallic, and ceramic parts, among others. Their uses may include fabrication of parts made of super alloys, ceramic dental restorations, and high temperature resistant interlocking ceramic tiles for lunar and Martian landing pads. Large scale applications may include fabrication of large sand casting molds, building façade structures, and public art.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, to attain higher density for the final part, each of the inhibitor-inserted layers may be compressed prior to delivery of the subsequent layer. Alternatively, compression may be applied to the top of the entire powder vat once all layers are spread and inhibitor is injected for each. The CAD file containing information about the desired 3D object may be modified to account for geometrical distortions resulting from compression.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A 3D printing system for printing a desired 3D object comprising:
   a deposition system that deposits portions of a first material on a substrate;
   an insertion system that inserts a portion of a second material between portions of the deposited first material after having been deposited by the deposition system; and
   a fusing system that applies a fusing condition to the materials,
   wherein:
      the insertion system includes a nozzle that has an interior passageway through which the second material travels;
      the nozzle has a lower end that includes:
         a leading edge in the shape of a plow that can plow a trough between portions of the deposited first material when the lower end of the nozzle traverses such portions; and
         a rearward-facing opening though which the second material can be ejected from the nozzle and into the trough immediately after the trough is plowed by the leading edge, thereby filling the trough as the trough is plowed;
      the insertion system causes:
         the leading edge to plow through portions of the first material; and
         the opening to eject the second material from the nozzle immediately after the trough is plowed by the leading edge, thereby filling the trough as the trough is plowed; and
      application of the fusing condition causes the desired 3D object to fuse.

2. The 3D printing system of claim 1 further comprising a storage container coupled to the nozzle at an end opposite the lower end, the storage container configured to store a powder or a liquid.

3. The 3D printing system of claim 2 wherein the insertion system includes a vibrating element that controls the flow of the second material.

4. The 3D printing system of claim 1 wherein the insertion system only uses the force of gravity to cause the second material to travel through the passageway and to be ejected into the trough.

5. The 3D printing system of claim 1 wherein the insertion system includes rotary axis actuator that controllably rotates the leading edge of the nozzle so as cause the leading edge to always be leading the direction of the nozzle movement.

6. The 3D printing system of claim 1 further comprising a controller connected to the deposition system and the insertion system, the controller configured to instruct the deposition system to deposit the first material in stacked layers, and instruct the insertion system to insert the second material between the portions of the first material in each stacked layer after the deposition system deposits the stacked layer into which the second material is inserted and before the deposition system deposits the next stacked layer.

7. The 3D printing system of claim 1 further comprising a controller connected to the insertion system, the controller configured to instruct the insertion system to insert the second material while the lower end of the nozzle is moving horizontally and while the lower end of the nozzle is moving vertically.

8. The 3D printing system of claim 7 wherein the controller is further configured to instruct the insertion system to insert the second material between portions of multiple layers of the first material, beginning to do so after all of the multiple layers have been deposited by the 3D printer.

9. The 3D printing system of claim 8 further comprising guy wires attached to the nozzle that prevent the nozzle from bending while the second material is being inserted.

10. The 3D printing system of claim 1 wherein the insertion system includes a six-axis gantry control system that separately controls six axes of nozzle movement.

11. The 3D printing system of claim 1 wherein the rearward-facing opening has an adjustable height.

12. The 3D printing system of claim 11 wherein the height of the rearward-facing opening is controlled by a movable gate.

13. The 3D printing system of claim 1 wherein the fusing system is a heater, and wherein the fusing condition is sintering.

14. The 3D printing system of claim 1 wherein the fusing system is a liquid injector, and wherein the fusing condition is exposure to a liquid.

15. A 3D printing system for printing a 3D object, comprising:
  a substrate configured to receive a first material that fuses when subjected to a fusing condition;
  a nozzle for dispensing a second material that does not fuse when subjected to the fusing condition, the nozzle having an interior passageway through which the second material travels, the nozzle having a lower end including a leading edge in the shape of a plow configured to plow a trough between portions of the first material that are not yet fused, and a rearward-facing opening configured to eject the second material into the trough after the trough is plowed by the leading edge, thereby filling the trough with the second material as the trough is plowed; and
  a rotary axis actuator that controllably rotates the leading edge of the nozzle so as cause the leading edge to always be leading the direction of the nozzle movement.

16. The 3D printing system of claim 15 further comprising a vibrating element configured to control flow of the second material.

17. The 3D printing system of claim 15 further comprising a deposition device configured to deposit the first material onto the substrate, a fusing device configured to provide the fusing condition, and a gantry device configured to move the nozzle within the first material.

18. The 3D printing system of claim 17 further comprising a controller configured to instruct the deposition device to deposit the first material in stacked layers, and instruct the nozzle and gantry device to insert the second material within the first material in each stacked layer and between depositions of the stacked layers by the deposition device.

19. The 3D printing system of claim 15 wherein the rearward-facing opening has an adjustable height.

20. A 3D printing system for printing a 3D object, comprising:
  a substrate configured to receive a first material that fuses when subjected to a fusing condition;
  a nozzle for dispensing a second material that does not fuse when subjected to the fusing condition, the nozzle having an interior passageway through which the second material travels, the nozzle having a lower end including a leading edge in the shape of a plow configured to plow a trough between portions of the first material that are not yet fused, and a rearward-facing opening configured to eject the second material into the trough after the trough is plowed by the leading edge, thereby filling the trough with the second material as the trough is plowed; and
  a deposition device configured to deposit the first material onto the substrate, a fusing device configured to provide the fusing condition, and a gantry device configured to move the nozzle within the first material.

* * * * *